Feb. 4, 1930.  G. G. BEHN  1,746,183
STEERING WHEEL
Filed June 25, 1928  2 Sheets-Sheet 1
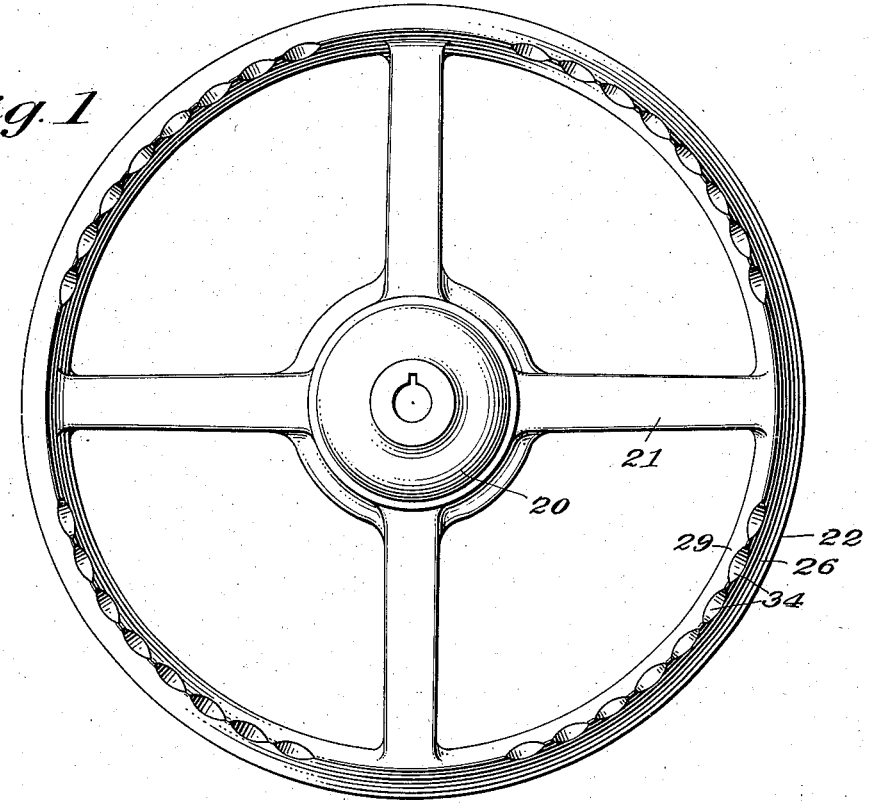
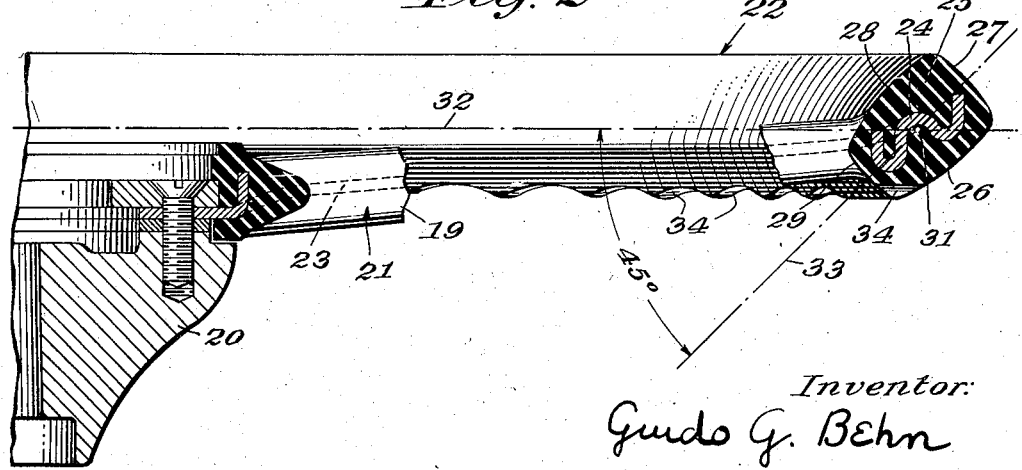
Inventor:
Guido G. Behn
By Macleod, Calver, Copeland & Dike
Attorneys.

Feb. 4, 1930.  G. G. BEHN  1,746,183
STEERING WHEEL
Filed June 25, 1928  2 Sheets-Sheet 2

Inventor:
Guido G. Behn
By Macleod, Calver, Copeland & Dike
Attorneys.

Patented Feb. 4, 1930

1,746,183

UNITED STATES PATENT OFFICE

GUIDO G. BEHN, OF DETROIT, MICHIGAN, ASSIGNOR TO HUDSON MOTOR CAR COMPANY, OF DETROIT, MICHIGAN, A CORPORATION OF MICHIGAN

STEERING WHEEL

Application filed June 25, 1928. Serial No. 287,998.

This invention relates to steering wheels for motor vehicles, and more particularly to the construction of the wheel rim, an object of the invention being to provide an improved steering wheel in which the annular rim is not only constructed so as to have the required strength and rigidity to withstand strains and stresses during operation of the vehicle, but also to provide a better, more satisfactory and safer grip for the hands of the driver.

In the manufacture of automobiles, particularly where production is conducted on a large scale, it is necessary that the various parts of the car be standardized, and this is true of steering wheels which for a given line of cars are of standard construction with rims of the same size and shape. This has heretofore been objectionable from the standpoint of the users owing to the difference in the size of the hands of the operators, especially as between men and women drivers. Wheel rims in practice are made substantially round or slightly oval, without any attempt to conform to the hand grip contour, and hence it has been impossible to standardize on any particular cross sectional size of rim which will be satisfactory and suitable to the majority of drivers using a standard line of cars of a particular manufacturer.

An object of the present invention is to overcome the foregoing disadvantages and to provide a steering wheel having a rim of such construction that a given cross sectional size will furnish a satisfactory and safer hand grip for practically all car users, while at the same time enabling the driver to hold the wheel safer, with less effort and strength, and without the possibility of the wheel flying out of the driver's hands when encountering rough road or irregular pavement.

Other objects of this invention will appear in the following description and appended claims, reference being had to the accompanying drawings forming a part of this specification wherein like reference characters designate corresponding parts in the several views.

Fig. 1 is a bottom plan view illustrating a steering wheel embodying my invention.

Fig. 2 is a fragmentary sectional view illustrating the construction of the wheel rim.

Figure 3:
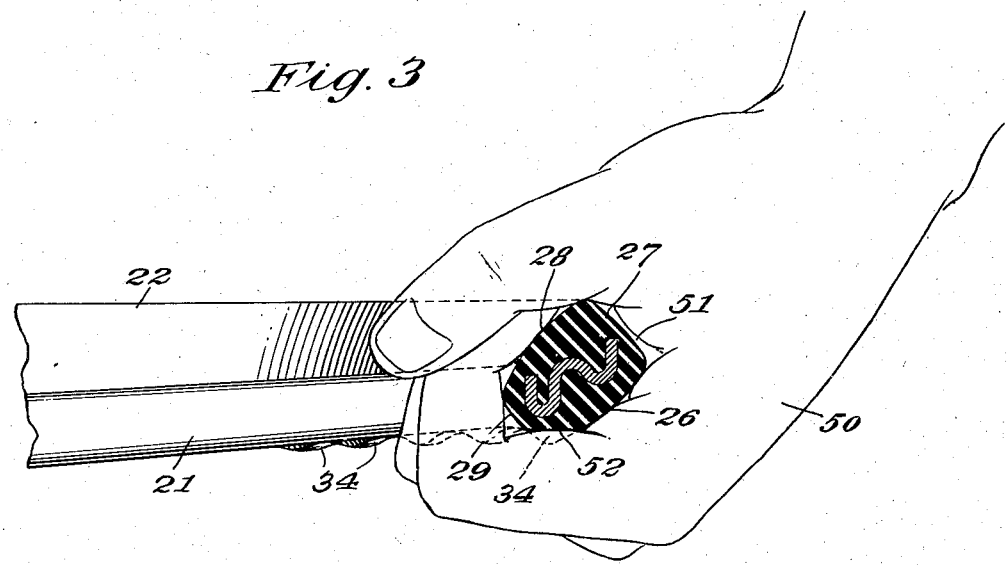
Fig. 3 is a fragmentary section of a wheel rim illustrating the hand grip thereon.

Before explaining in detail the present invention and the several features of construction embodied therein, it is to be understood that this invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

In the present instance I have illustrated the invention as applied to a steering wheel of the type in which the rim of the wheel, together with the central hub and spokes, each comprises an inner metal core covered, or partially covered as in the case of the hub, with a relatively hard non-metallic material, such as rubber, which is molded around the core members while in plastic condition. The rim and spoke core members are corrugated or ribbed, or the rim core may comprise a tube rigidly joined to the several spokes or cores to provide a structure of the desired strength.

Referring to the drawings wherein I have illustrated a present preferred form of my invention, it will be seen that the steering wheel comprises a central hub 20 of suitable construction and radially extending spokes or arms 21 joined at their outer ends by means of an annular rim 22. In the present instance each spoke 21 comprises an inner metallic core member 23 which is covered with a suitable plastic composition 19 such as rubber or the like. The annular rim 22 also comprises in the present instance an inner core member 24 which is also covered with a similar plastic composition 25. The core member 23 of each spoke 21 is joined to the annular core member 24 of the rim, and these core members may be corrugated or ribbed to increase the strength of the wheel.

Figure 4:
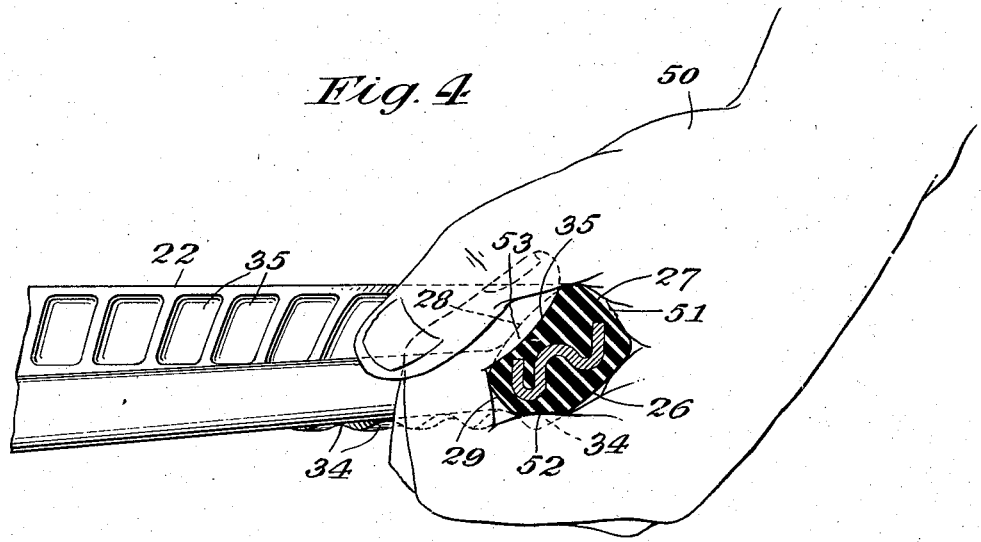
Fig. 4 is a similar view illustrating a somewhat modified form of wheel.

The rim is constructed so as to take into consideration, first, the approximate normal angle in which the arm of the driver extends with relation to the rim in driving position, and the normal contour of the hand grip as shown by the position of the hand 50 in Figs. 3 and 4.

The rim 22 is preferably substantially trapezoidal in cross section, being tilted up with respect to the horizontal plane of the wheel so that the central axis or major longitudinal center plane 33 thereof will extend obliquely relatively thereto, and preferably at an angle of approximately 45° as shown in Figure 2, corresponding substantially to the normal angle in which the arm of the driver extends with respect to the wheel rim.

In other words, the major axis 33 of the trapezoidal cross section of the wheel rim extends obliquely upwardly and outwardly with respect to the wheel axis.

It will be seen that the lower outer side 26 of the trapezoidal rim is disposed for substantially the whole or greater part of its length below the plane 32 of the center 31 of said rim, while the upper inner side 28 is disposed for substantially the whole or greater part of its length above said plane. The opposite inclined sides 26 and 28 of the rim converge downwardly and inwardly, thereby providing an upper outer inclined side 27 which is nearly flat and which has a substantially wider surface than the lower inner side 29.

Referring to Figs. 3 and 4, when the hand is closed so as to grasp the rim 22, it will be seen that the contour of the grip results in a portion 51 corresponding to the side 27 of the rim, while the slightly convex and converging sides 26 and 28, and the side 29, of the rim conform very closely to the contour of the lower portion of the grip.

Along the lower edge of the rim at the corner or junction between the sides or faces 26 and 29 the rim is provided with finger grooves 34, the location thereof being such as to accommodate the upper parts 52 of the fingers in the normal driving position of the hand and arm. In the embodiment shown in Fig. 4 the upper side or faces 28 of the rim is provided with finger grooves 35, preferably diametrically opposite the grooves 34. These grooves or finger depressions 35 are also located so that the lower parts 53 of the fingers will rest in these grooves in the normal driving position.

The rim 22 and spokes 21 of the wheel preferably extend in substantially the same horizontal plane, but by tilting the rim outwardly and upwardly relative to this plane and constructing the rim preferably in substantially the manner above described, increased strength may be obtained while at the same time enabling a rim of small cross section to be utilized while facilitating the grasp of the rim by the operator of the vehicle.

What I claim is:

1. In a motor vehicle steering wheel comprising hub, spokes and an annular rim, an improved rim of substantially trapezoidal cross section having a major axis extending substantially obliquely upwardly and outwardly with respect to the wheel axis, a top face and a bottom face both disposed, respectively, substantially entirely above and below a horizontal plane extending through the center of the rim, the top face being wider than the bottom face, and inner and outer side faces extending between said top and bottom faces and slightly converging toward said bottom face.

2. In a motor vehicle steering wheel comprising hub, spokes and an annular rim, and improved rim of substantially trapezoidal cross section having a major axis extending substantially obliquely upwardly and outwardly with respect to the wheel axis, a top face and a bottom face both disposed, respectively, substantially entirely above and below a horizontal plane extending through the center of the rim, the top face being wider than the bottom face, inner and outer side faces extending between said top and bottom faces and slightly converging toward said bottom face, and finger grooves formed on said rim at substantially the juncture of the outer side face and the bottom face.

In testimony whereof I affix my signature.

GUIDO G. BEHN.